Patented Dec. 17, 1940

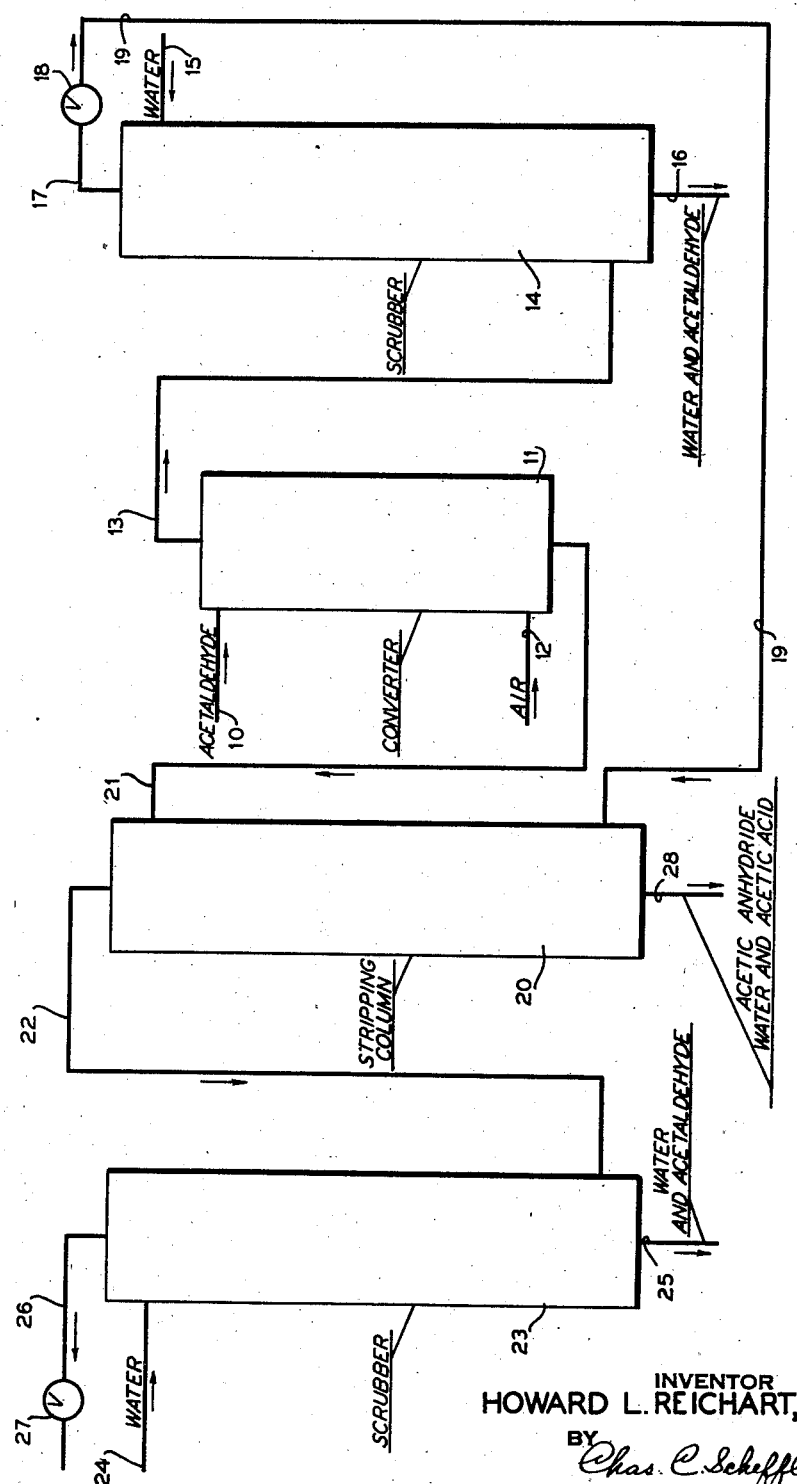

2,225,486

UNITED STATES PATENT OFFICE 2,225,486

MANUFACTURE OF ACETIC ANHYDRIDE

Howard L. Reichart, Jr., Charleston, W. Va., assignor to Carbide and Carbon Chemicals Corporation, a corporation of New York Application September 28, 1938, Serial No. 232,060

8 Claims. (Cl. 260—546)

This invention relates to the formation of acetic anhydride by the direct oxidation of acetaldehyde by means of molecular oxygen.

It is known that acetaldehyde may be oxidized by means of molecular oxygen to form acetic anhydride and water according to the equation

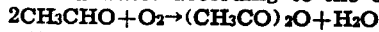
$2CH_3CHO + O_2 \rightarrow (CH_3CO)_2O + H_2O$

The reaction of the acetic anhydride with the water to form acetic acid is quite slow at low temperatures so that the water and unreacted acetaldehyde can be separated from the reaction product by distillation under reduced pressure, or by other means, without causing hydrolysis of an unduly large amount of the acetic anhydride present.

The water can be removed from the anhydride most satisfactorily by low-temperature distillation, but in order to do this the unreacted acetaldehyde present in the mixture from the oxidation reaction must first be removed. This can be done by distillation, flashing under vacuum, and the like, but from the commercial standpoint such methods are prohibitively expensive when conditions of temperature and pressure are maintained that will reduce the hydrolysis of the anhydride to a reasonable amount. For example, the rate of hydrolysis of acetic anhydride is very high above 60° C., and it is quite high from 50° to 60° C. Therefore, in order to recover a reasonable quantity of acetic anhydride from the reaction mixture it is necessary to keep the temperature of the mixture below 60° C. If acetaldehyde is to be separated from the reaction mixture by vacuum distillation, the absolute pressure at the head of the still column must not be greater than 3 inches of mercury, in order to reduce the temperature of the mixture of anhydride and water in the base of the column or kettle to 60° C. At this absolute pressure the boiling point of acetaldehyde is minus 30° C. The costliness of condensing acetaldehyde by refrigeration at this low temperature, or of compressing the vapor (containing some wet acetic acid) from this pressure to about 15 pounds gauge pressure to be condensed with ordinarily available cooling water, is apparent. This represents the maximum temperature and absolute pressure that can be used. In order to obtain good recovery of the anhydride by this method, the temperature and pressure must be lowered even further.

It is the purpose of this invention to provide a means of separating acetaldehyde from mixtures containing acetic anhydride, acetaldehyde and water which is simple and efficient, involving low costs and a minimum amount of hydrolysis of the acetic anhydride. This may be accomplished by blowing an inert gas or mixture of gases, substantially free of acetaldehyde vapor, through the reaction mixture. Although it is not essential that oxygen be absent from the gas mixture, it is desirable that the concentration of the oxygen present in the mixture be below that necessary to support combustion of the acetaldehyde. Any gas or mixture of gases may be used provided that (1) it will not react with the acetic anhydride, and preferably will not react with the acetaldehyde (except oxygen), and (2) that its boiling point at the operating pressure is sufficiently below the operating temperature that it will not condense to an appreciable extent. Examples of such gases are ethane, propane, carbon dioxide and nitrogen. Of these, nitrogen is preferred inasmuch as it is available in large quantities from the air ordinarily used in the oxidation of the acetaldehyde.

In its preferred form, this invention comprises removing acetaldehyde vapor from the nitrogen (usually containing a very small amount of oxygen) obtained from the oxidation converter in which air is blown through the acetaldehyde, by scrubbing it with cold water, and then bringing the gas into intimate contact with the reaction mixture (containing unreacted acetaldehyde) immediately as it is removed from the converter. Although any type of vessel may be used for the latter operation, it is preferred to employ a device providing efficient intermingling of the gas and liquid phases, such as a packed tower or bubble-cap column in which the liquid and gas may be mingled in countercurrent flow. This device, of whatever form selected, will be referred to herein as the stripping column. By employing a countercurrent extraction or stripping of the acetaldehyde, the maximum possible partial pressure of acetaldehyde in the gas is obtained, and its subsequent recovery is facilitated.

For continuous operation and also for greatest efficiency, the stripping column must be operated at a pressure low enough to permit the nitrogen, or other inert gas, to remove the acetaldehyde at substantially the same rate as it is furnished by the converter liquid supplied to the column. The rate at which the acetaldehyde is removed from the liquid, and the completeness of its removal, additionally depend upon the size of the column, and the temperatures and rates at which the fluids are supplied to the column. The temperature of the materials in the column may be the same as that maintained in the oxidation converter or it may be lowered to retard the hydrolysis of the acetic anhydride. Lowering the temperature reduces the vapor pressure of the acetaldehyde, thus necessitating a further reduction in pressure for the same column design and gas flow. If the column is operated at a temperature at or near that of the converter, it will be necessary to heat the liquid in the column in order to supply the heat of vaporization of the acetaldehyde. This is most conveniently accomplished by providing heating coils (through which steam or another hot fluid may be circulated) on the trays of the column.

In general, very satisfactory results are obtained when the oxidation reaction is operated at a pressure from about 50 to 100 pounds per square inch and at a temperature of about 40° to 80° C., the latter depending to some extent upon the pressure. The scrubbing operation to remove acetaldehyde from the spent air is more efficient if it is conducted under substantially the same pressure as the oxidation reaction, but at a lower temperature, for example, that of ordinary cold water, or about 0° to 30° C. The removal of acetaldehyde from the reaction mixture by means of the washed, spent air (or nitrogen) is best conducted at temperatures from room temperature up to about 50° C., inasmuch as higher temperatures cause excessive hydrolysis of the acetic anhydride, and lower temperatures reduce the partial pressure of the acetaldehyde excessively. This step should be operated under a pressure considerably below that of the reaction zone, for best results, inasmuch as the lower total pressure increases the partial pressure of the acetaldehyde. Since the vapor pressure of acetaldehyde is about two atmospheres at 45° C., pressures ranging from atmospheric to about 50 pounds per square inch are generally the most suitable for the efficient removal and recovery of the acetaldehyde from the reaction mixture, depending, of course, upon the temperature at which this step is operated, and also to some extent upon the pressure of the oxidation zone.

The accompanying drawing diagrammatically illustrates the flow of materials in a typical system embodying the invention.

In the system shown, acetaldehyde is supplied through a line 10 to the top of a vessel 11 and air is admitted through a line 12 into the bottom of the vessel 11 where the acetaldehyde is oxidized to acetic anhydride under a pressure of, for example, about 100 pounds per square inch. The residual nitrogen and unabsorbed oxygen, if any, leave the reaction vessel 11 through a line 13 and pass into a scrubber 14 wherein the gas is brought into contact with cold water supplied through a line 15. In the scrubber 14, which may be of any well-known design, such as a packed column or bubble-cap tower, the water absorbs the acetaldehyde from the gas and the mixture of water and acetaldehyde leaves the scrubber 14 through a line 16, whereupon the acetaldehyde may be recovered by distillation in conventional manner. The gas, free of acetaldehyde vapor, leaves the scrubber 14 through a line 17 and passes through a valve 18 which reduces the pressure, for example, to about 25 pounds per square inch. From the valve 18 the gas passes through a line 19 and into the bottom of a stripping column 20. The mixture of acetaldehyde, acetic anhydride, water, acetic acid and whatever by-products may be formed in the converter 11 leaves the converter 11 through a line 21 and enters the top of the stripping column 20. In the stripping column 20 the gas removes the acetaldehyde from the converter product and passes out of the top of the stripping column 20 through a line 22 and thence into a scrubber 23 similar to the scrubber 14. In the scrubber 23 the acetaldehyde vapor present in the gas is removed by washing with cold water supplied through the line 24. The mixture of water and acetaldehyde leaves the scrubber 23 through a line 25 and its acetaldehyde content may be recovered by distillation. The gas, purified of acetaldehyde vapor, leaves the scrubber 23 through a line 26 and its pressure is reduced to atmospheric pressure in passing through a valve 27 and thence exhausted into the air. The converter product in the stripping column 20 freed of acetaldehyde passes out of the bottom of the stripping column 20 through a line 28 and thence to a distillation system or other means whereby the water may be quickly removed.

In addition to the method shown, the removal of the acetaldehyde from the products of reaction may be accomplished in combination with the oxidation reaction. Thus, by passing the acetaldehyde downward through a long column or tower designed to prevent the liquid from circulating upward, (such as a bubble-cap column or even a packed column), countercurrent to the air entering the bottom, it is possible to remove the acetic anhydride and other materials substantially free from acetaldehyde. This method, however, has the limitation that the absorption of acetaldehyde by the air at the base of the column cannot take place at a pressure lower than that employed in the oxidation reaction, which is mostly further up in the column.

Many variations of the process will be apparent, and the invention should not be limited other than as defined by the appended claims.

I claim:

1. In the process of making acetic anhydride by passing air through acetaldehyde whereby part thereof is oxidized to acetic anhydride and water, the step of removing the unoxidized acetaldehyde from the products of reaction, which comprises scrubbing the residual air from the oxidation reaction with water, and passing the residual air through the products of reaction containing the acetic anhydride immediately as they are removed from the oxidation reaction.

2. In the process of making acetic anhydride by passing air through acetaldehyde whereby part thereof is oxidized to acetic anhydride and water, the step of removing and recovering the unoxidized acetaldehyde from the products of reaction which comprises scrubbing the residual air from the oxidation reaction with water, stripping the unoxidized acetaldehyde from the products of reaction containing the acetic anhydride by passing the residual air through the products of reaction immediately as they are removed from the oxidation reaction, and scrubbing the air from the stripping operation with water.

3. In the process of making acetic anhydride by passing air through acetaldehyde under superatmospheric pressure, the step of removing unoxidized acetaldehyde from the products of reaction, which comprises scrubbing the residual air from the oxidation reaction with water under substantially the same pressure as the oxidation reaction, and then passing the residual air at a lower pressure through the products of reaction containing acetic anhydride immediately as they are removed from the oxidation reaction.

4. In the process of making acetic anhydride by passing air through acetaldehyde under a pressure from about 50 to about 100 pounds per square inch and at a temperature from about 40° to about 80° C., the step of removing unoxidized acetaldehyde from the products of reaction at a sufficiently high rate to prevent substantial decomposition of the acetic anhydride, which comprises scrubbing the residual air from the oxidation reaction with cold water at substantially the pressure of the oxidation reaction, and then passing the residual air at a pressure from about atmospheric to about 50 pounds per square inch through the products of reaction containing acetic anhydride at a temperature from about room temperature to about 50° C. after they are removed from the oxidation reaction.

5. The process of making acetic anhydride which comprises passing a gas containing molecular oxygen through acetaldehyde whereby a part of the acetaldehyde is oxidized to acetic anhydride and water, scrubbing the gas, largely depleted of oxygen, with water to remove contained acetaldehyde vapor, passing the gas through the mixture containing acetic anhydride, water and unreacted acetaldehyde immediately as the mixture is removed from the oxidation zone to remove the unreacted acetaldehyde therefrom, and recovering the acetic anhydride from the remaining mixture.

6. The process of making acetic anhydride which comprises passing air through acetaldehyde whereby part of the acetaldehyde is oxidized to acetic anhydride and water, scrubbing the residual air, consisting largely of nitrogen and a small amount of unabsorbed oxygen, with water to remove contained acetaldehyde vapor, passing the residual air through the mixture from the oxidation step containing acetic anhydride, water and unreacted acetaldehyde immediately as the mixture is removed from the oxidation zone to remove the acetaldehyde therefrom, and recovering the acetic anhydride from the remaining mixture.

7. The process of making acetic anhydride which comprises passing air through acetaldehyde under superatmospheric pressure whereby part of the acetaldehyde is oxidized to acetic anhydride and water, scrubbing the residual air, largely depleted of oxygen, with water under substantially the same pressure to remove contained acetaldehyde vapor, passing the residual air at a lower pressure through the mixture from the oxidation reaction containing acetic anhydride, water and unreacted acetaldehyde immediately as the mixture is removed from the oxidation zone to remove the acetaldehyde therefrom, and recovering the acetic anhydride from the remaining mixture.

8. The process of making acetic anhydride which comprises passing air through acetaldehyde under a pressure from about 50 to about 100 pounds per square inch and at a temperature from about 40° to about 80° C., scrubbing the air, largely depleted of oxygen, with cold water at substantially the same pressure, passing the scrubbed air at a pressure from about atmospheric to about 50 pounds per square inch through the mixture from the oxidation step containing acetic anhydride, unreacted acetaldehyde and water at a temperature from about room temperature to about 50° C. after the mixture is removed from the oxidation zone to remove acetaldehyde therefrom, and recovering the acetic anhydride from the remaining mixture.

HOWARD L. REICHART, Jr.